United States Patent
Shetty et al.

(10) Patent No.: US 12,505,411 B2
(45) Date of Patent: Dec. 23, 2025

(54) SYSTEMS AND METHODS FOR GRANULAR LOCATION BASED DATA SECURITY

(71) Applicant: Omnissa, LLC, Mountain View, CA (US)

(72) Inventors: Rohit Pradeep Shetty, Bangalore (IN); Ramanandan Nambannor Kunnath, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 126 days.

(21) Appl. No.: 18/118,752

(22) Filed: Mar. 8, 2023

(65) Prior Publication Data
US 2024/0232814 A1    Jul. 11, 2024

(30) Foreign Application Priority Data
Jan. 5, 2023 (IN) .............................. 202341001100

(51) Int. Cl.
| | | |
|---|---|---|
| *G06Q 10/00* | (2023.01) | |
| *G06Q 10/1093* | (2023.01) | |
| *H04W 4/00* | (2018.01) | |
| *H04W 4/33* | (2018.01) | |

(52) U.S. Cl.
CPC .......... *G06Q 10/1095* (2013.01); *H04W 4/33* (2018.02)

(58) Field of Classification Search
CPC ................................ G06Q 10/00; H04W 4/33
USPC ....................................................... 705/7.19
See application file for complete search history.

(56) References Cited

U.S. PATENT DOCUMENTS

| | | | | |
|---|---|---|---|---|
| 8,644,506 | B2* | 2/2014 | Zellner | G06F 21/62 |
| | | | | 713/153 |
| 2005/0015723 | A1* | 1/2005 | Light | G06Q 10/10 |
| | | | | 715/271 |
| 2007/0200674 | A1* | 8/2007 | Moore | G01C 21/26 |
| | | | | 340/8.1 |
| 2008/0132251 | A1* | 6/2008 | Altman | G06Q 30/0268 |
| | | | | 455/457 |
| 2014/0047234 | A1* | 2/2014 | Davis | G06Q 10/10 |
| | | | | 713/160 |
| 2015/0156075 | A1* | 6/2015 | Gist | H04L 41/22 |
| | | | | 709/201 |
| 2016/0142873 | A1* | 5/2016 | Trivedi | H04W 4/021 |
| | | | | 455/456.1 |

* cited by examiner

*Primary Examiner* — Mustafa Iqbal
(74) *Attorney, Agent, or Firm* — Kim & Stewart LLP

(57) ABSTRACT

Disclosed are various embodiments of systems and methods of Granular location-based data security. Various embodiments can be configured to at least identify a map having a plurality of regions, each region of the plurality of regions corresponds to a real-world location and one of a plurality of security indicators. Next, various embodiments can receive a signal that indicates that a user has entered a first real-world location and then, based on the signal, determine a region of the plurality of regions. Next, various embodiments can receive a document access request to access a document. The various embodiments can then determine that the client device is not permitted to access the document while located in the region. Then various embodiments can send, to the client device, a response that directs the client device to perform an action that inhibits the client device from accessing the document.

12 Claims, 7 Drawing Sheets

SYSTEMS AND METHODS FOR GRANULAR LOCATION BASED DATA SECURITY

RELATED APPLICATIONS

Benefit is claimed under 35 U.S.C. 119(a)-(d) to Foreign Application Serial No. 202341001100 filed in India entitled "SYSTEMS AND METHODS FOR GRANULAR LOCATION BASED DATA SECURITY", on Jan. 5, 2023, by VMware, Inc., which is herein incorporated in its entirety by reference for all purposes.

BACKGROUND

Enterprises are often concerned with keeping private enterprise data private. For instance, private enterprise data may not be appropriate to view in public places, like coffee shops, due to the possibility that the private enterprise data could be seen by people without the appropriate rights to view the private enterprise data. Even in private spaces, certain private enterprise data may not be appropriate to display due to the people within the private space not having the appropriate rights to view the private enterprise data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for granular location based data security. Enterprises are often concerned with keeping private enterprise data private. For instance, private enterprise data may not be appropriate to view in public places, like coffee shops, due to the possibility that the private enterprise data could be seen by people without the appropriate rights to view the private enterprise data. Even in private spaces, certain private enterprise data may not be appropriate to display due to the people within the private space not having the appropriate rights to view the private enterprise data.

Embodiments of the present disclosure are directed to systems and methods of granular location based data security that can determine a device's access to enterprise data based on the current location of the client device. Such a system may allow a user to view a document in a private location, such as a private office, but deny the user from viewing the same document in a public location, such as a break room or a crowded hallway.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
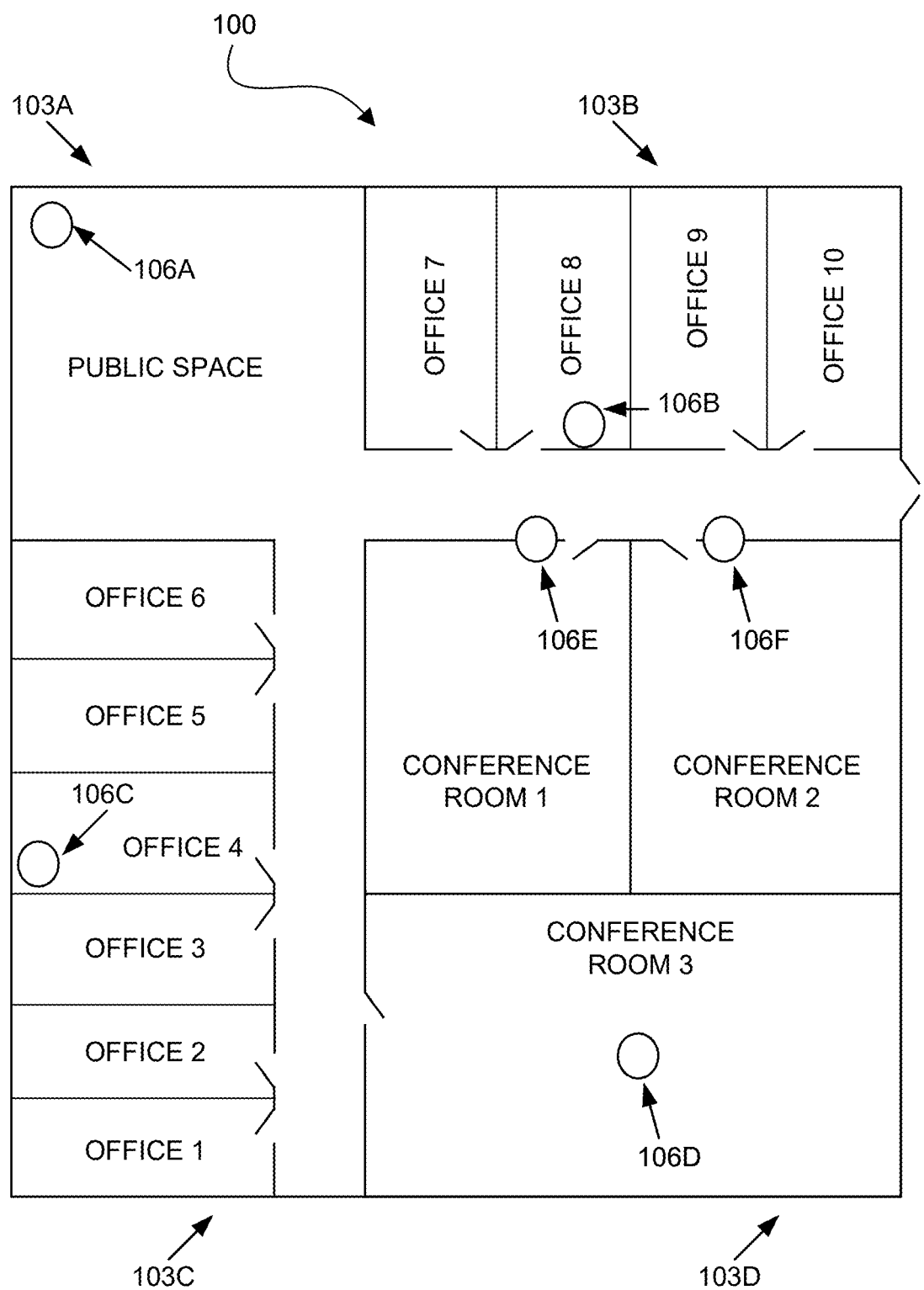
FIG. 1 is a pictorial diagram of an example region map used by at least one of several embodiments of the present disclosure.

FIG. 1 is a pictorial diagram of an example map 100 used by at least one of several embodiments of the present disclosure. A map 100 can represent a space in the physical world or a space in a virtual world. The map 100 may include markings that represent at least some physical or virtual structures and spaces. For instance, FIG. 1 depicts an example of an office space having 10 private offices, a public space (e.g., a break room or cafeteria), 3 conference rooms, hallways connecting these spaces, and doors.

As depicted in FIG. 1, the map 100 can include one or more regions 103A-D (generically as "region 103" or "regions 103"). A region 103 can be identified on a map 100 in various ways. As depicted in FIG. 1, each region is identified by a specific pattern on the drawing. For instance, a first region 103A is identified on the map 100 using a diagonal cross-hatch pattern to depict the region. A second region 103B and a third region 103C are identified using a dotted pattern. A fourth region 103D is identified by a grid pattern. The pattern of the region 103 can correspond to the expected level of security for the region. For instance, a map 100 can include a key that identifies that regions 103 that have a diagonal cross-hatch pattern are identified as public areas where secure documents should not be open. The map 100 can also include a region 103 that corresponds to a highly private area, such as an office space or private location where secure files can be opened freely. The map 100 can also include a region 103 that corresponds to an area that would seem otherwise private, but displaying secure documents may have certain conditions. Each region 103 can correspond to a real-world location, such as a portion of an office, a portion of a coffee shop, or other spaces.

Each region 103 on a map 100 can include one or more location detection devices 106A-F (generically as "location detection device(s) 106"). A location detection device 106 can be any device that can connect to a network and that can, actively or passively, identify a person or a person's mobile device when the person or mobile device enters a region 103 in the real-world. For example, a location detection device 106 can be a router, a wireless hotspot, a beacon, a Bluetooth-enabled device, and/or a network-enabled device. In at least some embodiments, the location detection device 106 can include an short-range wireless identification reader, such as an RFID reader, or other radio-wave detection device.

The location detection devices 106 can be used to detect a client device as it moves through the regions 103 on a map 100. A region 103 can have one or more location detection devices 106 that can be used to calculate or triangulate a precise location of the client device. In FIG. 1, the first region 103A includes one location detection device 106, location detection device 106A. In FIG. 1, the second region 103B includes one location detection device 106, location detection device 106B. In FIG. 1, the third region 103C includes one location detection device 106, location detection device 106C. In FIG. 1, the fourth region 103D includes three location detection devices 106, location detection devices 106D-F. Location detection devices 106A-D can be wireless network access points that are strategically placed on the map 100 to maximize the likelihood of access from the client device within the region 103. However, location detection devices 106E and 106F can be wireless radio frequency readers, such as an RFID reader. In such a situation, the user may need to hold the client device near the location detection device 106E or 106F as a means to access a conference room. In doing so, a location detection device 106E or 106F would inherently know the location of the client device with respect to the region 103 on the map 100.

Figure 2:
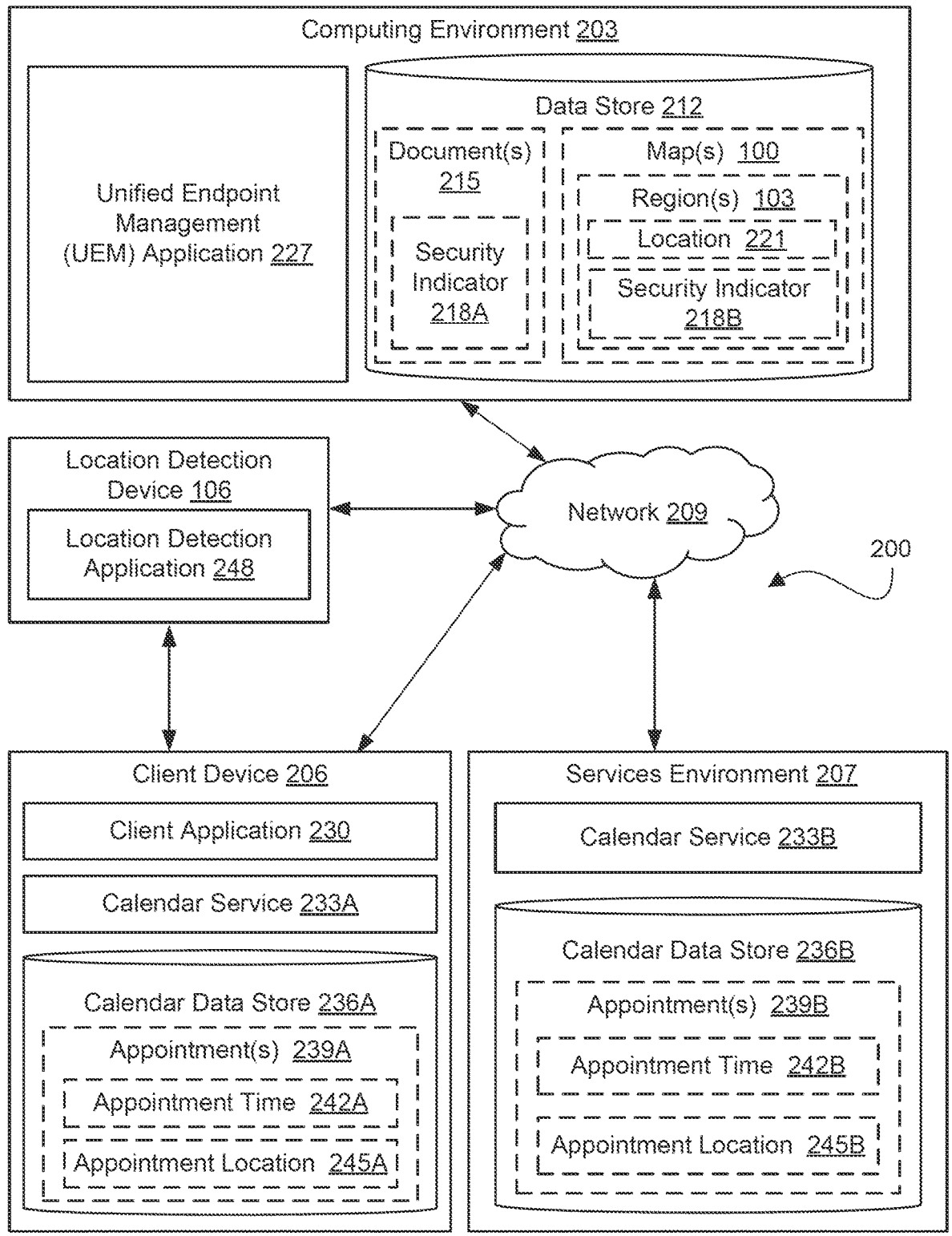
FIG. 2 is a drawing of a first network environment according to various embodiments of the present disclosure.

With reference to FIG. 2, shown is a network environment 200 according to various embodiments. The network environment 200 can include a computing environment 203, a client device 206, and a location detection device 106, which can be in data communication with each other via a network 209.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource, or any other distributed computing arrangement. In some cases, the computing environment 203 can correspond to an elastic computing resource where the allotted capacity of processing, network, storage, or other computing-related resources can vary over time.

Various data is stored in a data store 212 that is accessible to the computing environment 203. The data store 212 can be representative of a plurality of data stores 212, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 212 is associated with the operation of the various applications or functional entities described below. This data can include documents 215 and maps 100, and potentially other data.

The documents 215 can represent one or more files that can be shared by computing devices. The documents 215 can represent various types of information, such as images, text, sound, video, and any other type of information. The information stored within the documents 215 can be important to people or businesses, so ensuring the security of the documents 215 may be important. A document 215 can include or be associated with a security indicator 218A (generically as "security indicator 218" or "security indicators 218"). A security indicator 218 can represent the level of access to the document 215 as it relates to one or more regions 103. For example, a document 215 can have a security indicator 218 that indicates that the document 215 is safe to open in a first region 103, but not in a second region 103. In another example, a document 215 can have a security indicator 218 that requires that the client device 206 alert the user through a user interface to make them aware of the security of the document 215 prior to allowing the user to access the document 215 within a specified region 103. In another example, the security indicator 218 can indicate that the document 215 cannot be accessed in any region 103 on a first map 100, but it is only accessible in one region 103 of a second map 100.

The maps 100 can represent a two-dimensional or three-dimensional representation of a real-world location, such as an office, a building, a house, or any space. An example of a map 100 is depicted in FIG. 1, as previously discussed. The map 100 can have lines that represent the boundaries of the office, building, house, or space. The map 100 can also have lines that represent walls, doors/entrances/exits, or any other structure. A map 100 can include one or more regions 103, as described above in FIG. 1. A region 103 can correspond to a location 221, as described herein (See FIG. 1). The location 221 can represent the boundaries of the region 103 and any space within those boundaries. The location 221 represents a real-world space for which the region 103 occupies.

A region 103 can also be associated with a security indicator 218B. The security indicator 218B can include the same information as previously discussed as 218A, however the security indicator 218B is related to a region 103 rather than a document 215. The security indicator 218B can represent the level of security or level of caution to be used within the region 103. For instance, the security indicator 218B can indicate that the region 103 is representative of a public space, which means that private documents 215 should not be viewed in the region 103. In another instance, the security indicator 218B can indicate that the region 103 is representative of a private space, such as a private office; in such a situation, a system can worry less about keeping the documents 215 private because there is little to no expectation of the documents 215 being shared with others nearby. In another instance, the security indicator 218B can indicate that the region 103 is partially private and partially public, such that caution should be used when opening documents 215 in the region 103.

Various applications or other functionality can be executed in the computing environment 203. The components executed on the computing environment 203 include the unified endpoint management (UEM) application 227, and other applications, services, processes, systems, engines, or functionality not discussed in detail herein. The UEM application 227 can be executed to communicate with a location detection device 106, a client device 206, and a services environment 207. Further discussion about the processes performed by the UEM application 227 can be found in the flowchart of FIG. 3 and the sequence diagrams of FIGS. 6A and 6B.

The client device 206 is representative of a plurality of client devices 206 that can be coupled to the network 209. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a client application 230 or other applications. The client application 230 can be executed in a client device 206 to access network content served up by the computing environment 200 or other servers, thereby rendering a user interface on the display. To this end, the client application 230 can include a browser, a dedicated application, or other executable, and the user interface can include a network page, an application screen, or other user mechanism for obtaining user input. The client device 206 can be configured to execute applications beyond the client application 230, such as email applications, social networking applications, word processors, spreadsheets, or other applications. The client application 230 can be executed to communicate with a location detection device 106, a computing environment 203, and a services environment 207. Further discussion about the processes performed by the client application 230 is found in the description of the sequence diagrams of FIGS. 6A and 6B.

In at least some embodiments, the client device 206 can be configured to execute a calendar service 233A. A calendar service 233 can be configured to manage calendar appointments 239 for a user, receive requests to search for appointments 239, select appointments 239 based on criteria, and send appointments 239 to computing devices within the network environment 200. An example of at least some of the functionality of the calendar service 233 will be further discussed with respect to FIG. 4.

Various data is stored in a calendar data store 236A that is accessible to the client device 206. The calendar data store 236 can include relational databases or non-relational databases, such as object-oriented databases, hierarchical databases, hash tables, or similar key-value data stores, as well as other data storage applications or data structures. Moreover, combinations of these databases, data storage applications, and/or data structures may be used together to provide a single, logical, data store. The data stored in the calendar data store 236 is associated with the operation of the various applications or functional entities on the client device 206 previously described and further described below. This data can include appointments 239A, and potentially other data.

Appointments 239A (or generically as "appointments 239") are representative of a meeting, gathering, or event that a user intends to attend. An appointment 239 can include an appointment time 242A and an appointment location 245A. The appointment time 242A can represent a day, date, time, time zone, or any other information related to time for a specific appointment 239. The appointment location 245B (or generically as "appointment location 245") can be representative of a real-world location. The appointment location 245 can be stored as a set of coordinates within a space, an address, a location name (e.g., a business name), or a location number (e.g., meeting room number), or any other means of identifying a location. The combination of the appointment time 242 and the appointment location 245 can be important for determining when a user and/or client device 206 is expected to be in a certain location within the real-world.

The services environment 207 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the services environment 207 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource, or any other distributed computing arrangement. In some cases, the services environment 207 can correspond to an elastic computing resource where the allotted capacity of processing, network, storage, or other computing-related resources can vary over time.

The services environment 207 can execute a calendar service 233B which performs the same functionality as calendar service 233A, except within the services environment 207. A calendar service 233B can be configured to manage calendar appointments 239 for a user, receive requests to search for appointments 239, select appointments 239 based on criteria, and send appointments 239 to computing devices within the network environment 200. An example of at least some of the functionality of the calendar service 233 will be further discussed with respect to FIG. 4.

Various data is stored in a calendar data store 236B that is accessible to the client device 206. The calendar data store 236 can include relational databases or non-relational databases, such as object-oriented databases, hierarchical databases, hash tables, or similar key-value data stores, as well as other data storage applications or data structures. Moreover, combinations of these databases, data storage applications, and/or data structures may be used together to provide a single, logical, data store. The data stored in the calendar data store 236 is associated with the operation of the various applications or functional entities on the client device 206 previously described and further described below. This data can include appointments 239B, and potentially other data.

The calendar data store 236B can include data, such as appointments 239B, appointment times 242B, and appointment locations 245B, which take on the same meanings as appointments 239A, appointment times 242A, and appointment locations 245A, respectively, except appointments 239B, appointment times 242B, and appointment locations 245B are stored on the calendar data store 236B instead of calendar data store 236A.

The location detection device 106 is representative of a plurality of location detection devices that can be coupled to the network 209. The location detection device 106 can include a processor-based system such as a computer system. A location detection device 106 can be any device that can connect to a network and that can, actively or passively, identify a person or a person's mobile device when the person or mobile device enters a region in the real-world. For example, a location detection device 106 can be a router, a wireless hotspot, a beacon, a Bluetooth-enabled device, and/or a network-enabled device. In at least some embodiments, the location detection device 106 can include an short-range wireless identification reader, such as an RFID reader, or other radio-wave detection device.

The location detection devices 106 can be used to detect a client device as it moves through the regions 103 on a map 100. A region 103 can have one or more location detection devices 106 that can be used to calculate or triangulate a precise location of the client device. In FIG. 1, the first region 103A includes one location detection device 106, location detection device 106A. In FIG. 1, the second region 103B includes one location detection device 106, location detection device 106B. In FIG. 1, the third region 103C includes one location detection device 106, location detection device 106C. In FIG. 1, the fourth region 103D includes three location detection devices 106, location detection devices 106D-F. Location detection devices 106A-D can be wireless network access points that are strategically placed on the map to maximize the likelihood of access from the client device within the region. However, location detection devices 106E and 106F can be wireless radio frequency readers, such as an RFID reader. In such a situation, the user may need to hold the client device near the location detection device 106E or 106F as a means to access a conference room. In doing so, a location detection device 106E or 106F would inherently know the location of the client device with respect to the region 103 on the map 100.

The location detection device 106 can be configured to execute various applications, such as a location detection application 248 or other applications. At least some of the functionality of the location detection application 248 will be further discussed below in FIGS. 5, 6A and 6B.

Figure 3:
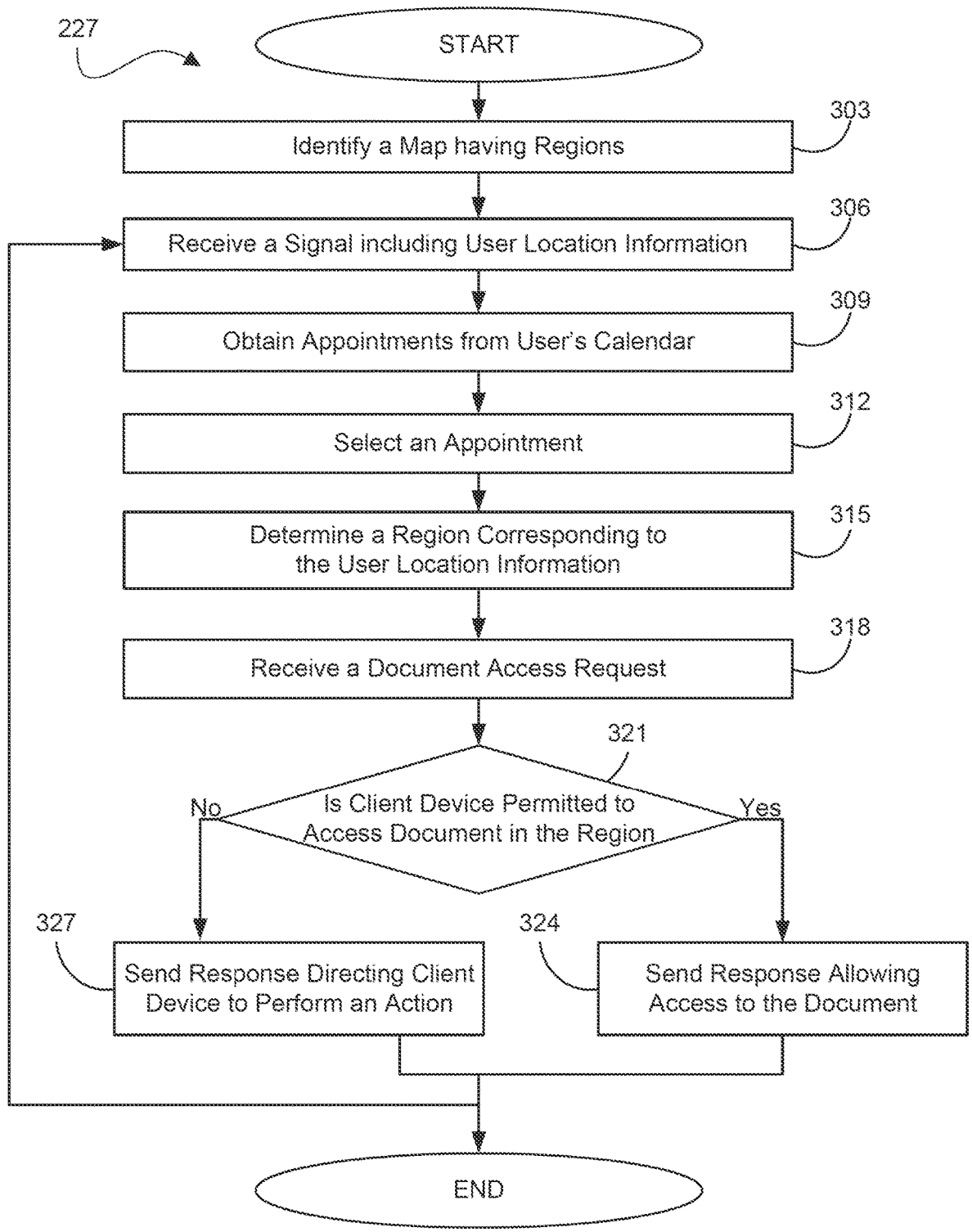
FIG. 3 is a flowchart illustrating one example of functionality implemented as portions of an application executed in a computing environment in the network environment of FIG. 2 according to various embodiments of the present disclosure.

Referring next to FIG. 3, shown is a flowchart that provides one example of the operation of a portion of the UEM application 227. The flowchart of FIG. 3 provides merely an example of the many different types of functional arrangements that can be employed to implement the operation of the depicted portion of the UEM application 227. As an alternative, the flowchart of FIG. 3 can be viewed as depicting an example of elements of a method implemented within the network environment 200.

Beginning with block 303, the UEM application 227 can identify a map 100. In at least one embodiment, the UEM application 227 can identify a map 100 in the data store 212 based on at least one of a location 221 or any other configurations stored in conjunction with the UEM application 227. In at least some embodiments, the map 100 can include one or more regions 103 and at least one of the regions corresponds to a real-world location and the one or more regions 103 is associated with at least one of a plurality of security indicators 218.

Next, at block 306, the UEM application 227 can receive a signal indicating that a user has entered a real-world location that corresponds to a region 103 on the map 100. In at least some embodiments, the UEM application 227 can receive the signal from a client device 206. In at least another embodiment, the UEM application 227 can receive the signal from a location detection device 106. The signal can include at least one of the location of the client device 206, the location of the location detection device 106, and/or an identifier for a location detection device 106.

Next, at block 309, the UEM application 227 can obtain appointments 239 for a user from the calendar service 233. In at least some embodiments, the UEM application 227 can obtain the appointments 239 from the calendar service 233A on the client device 206. In some embodiments, the UEM application 227 can obtain the appointments 239 from the calendar service 233B from the services environment 207. In many embodiments, the UEM application 227 can obtain the appointments 239 by sending the calendar service 233 a request for a list of appointments 239 for the user. The request can include information about the client device 206 including an identifier for a client device 206 or other credentials to identify the user with the calendar service 233. Next, the UEM application 227 can receive a response to the request for the list of appointments 239. In at least another embodiment, the calendar service 233 can periodically send a list of appointments 239 to the UEM application 227 for its use.

Next, at block 312, the UEM application 227 can select an appointment 239 from the list of appointments 239 obtained from the user's calendar. In at least one embodiment, the UEM application 227 can select the appointment 239 based at least on an appointment time 242B. In such a situation, a user can have a scheduled meeting as an appointment 239 to share certain information that is deemed safe to share. If a user were to share private information during the appointment 239, harm could result to the user or the user's business. So, the appointment time 242 can be used to select an appointment 239 out of the list of appointments 239. The appointment 239 could also be selected based on additional criteria, such as user information or other appointment details.

Next, at block 315, the UEM application 227 can determine a region 103 on a map 100 corresponding to the user's location information. Based on the location information received in block 306, the UEM application 227 can determine a region 103 on a map 100. Once the UEM application 227 has the region 103, the UEM application 227 now has access to the security indicator 218 for the region 103. In at least some embodiments, the region 103 can be determined by an appointment location 245 of the appointment 239 selected at block 312. In such an instance, the UEM application 227 can assume that the user is present at the appointment location 245 when determining the region 103 of the user.

Next, at block 318, the UEM application 227 can receive a document access request from a client application 230 on a client device 206. The document access request is representative of asking permission to viewing a document at a specific point in time. The document access request can include an identifier for a specific document 215 that the user wishes to open, along with other information related to the user and/or the client device 206.

Next, at block 321, the UEM application 227 can determine whether the client device 206 is permitted to access the document 215 in the region 103. In at least one embodiment, the UEM application 227 can determine whether the client device 206 is permitted to access the document 215 in the region 103 by comparing the security indicator 218A of the document 215 with the security indicator 218B of the region 103. In at least another embodiment, the UEM application 227 can determine whether the client device 206 is permitted to access the document 215 in the region 103 by recognizing that the security indicator 218A of the document 215 indicates that the document is locked and cannot be opened without additional information, such as a specific user credential. If the UEM application 227 determines that the client device 206 is permitted to access the document 215 in the region 103, then the process continues to block 324. However, if the UEM application 227 determines that the client device 206 is not permitted to access the document 215 in the region 103, then the process continues to block 327.

Next, at block 324 when the client device 206 is permitted to access the document 215, the UEM application 227 can send a response to the client application 230 on the client device 206 allowing access to the document 215. In at least one embodiment, the response can include a copy of the document 215 itself. In at least another embodiment, the response can include instructions that can be performed by the client application 230 to access the document 215 remotely. In at least one embodiment, once the UEM application 227 has sent the response to the client application 230 on the client device 206, the flowchart of FIG. 3 can come to an end. In at least another embodiment, once the UEM application 227 has sent the response to the client application 230 on the client device 206, the process can return to block 306 for the UEM application 227 to receive a signal including the user location information and continue the process.

Next, at block 327 when the client device 206 is not permitted to access the document 215, the UEM application 227 can send a response to the client application 230 on the client device 206 directing the client device 206 to perform a specified action. For instance, the response can include instructions to direct the client device 206 to display a warning message in a user interface on the client device 206. In at least another embodiment, the response can include instructions to direct the client device 206 to prevent the user from accessing any information about certain documents 215, including metadata, based on the security indicator 218A of the certain documents 215. In at least another embodiment, the response can include instructions to display a message to the user that instructs the user to navigate to a nearby location, such as a private room or meeting space, so that the document 215 can be opened. The message can be specific about a certain location within a map 100 that would allow the user to open the document 215. For instance, with respect to the map 100 on FIG. 1, the message could direct the user to navigate to an office within the region 103B or 103C.

In at least one embodiment, once the UEM application 227 has sent the response to the client application 230 on the client device 206, the flowchart of FIG. 3 can come to an end. In at least another embodiment, once the UEM application 227 has sent the response to the client application 230 on the client device 206, the process can return to block 306 for the UEM application 227 to receive a signal including the user location information and continue the process.

Figure 4:
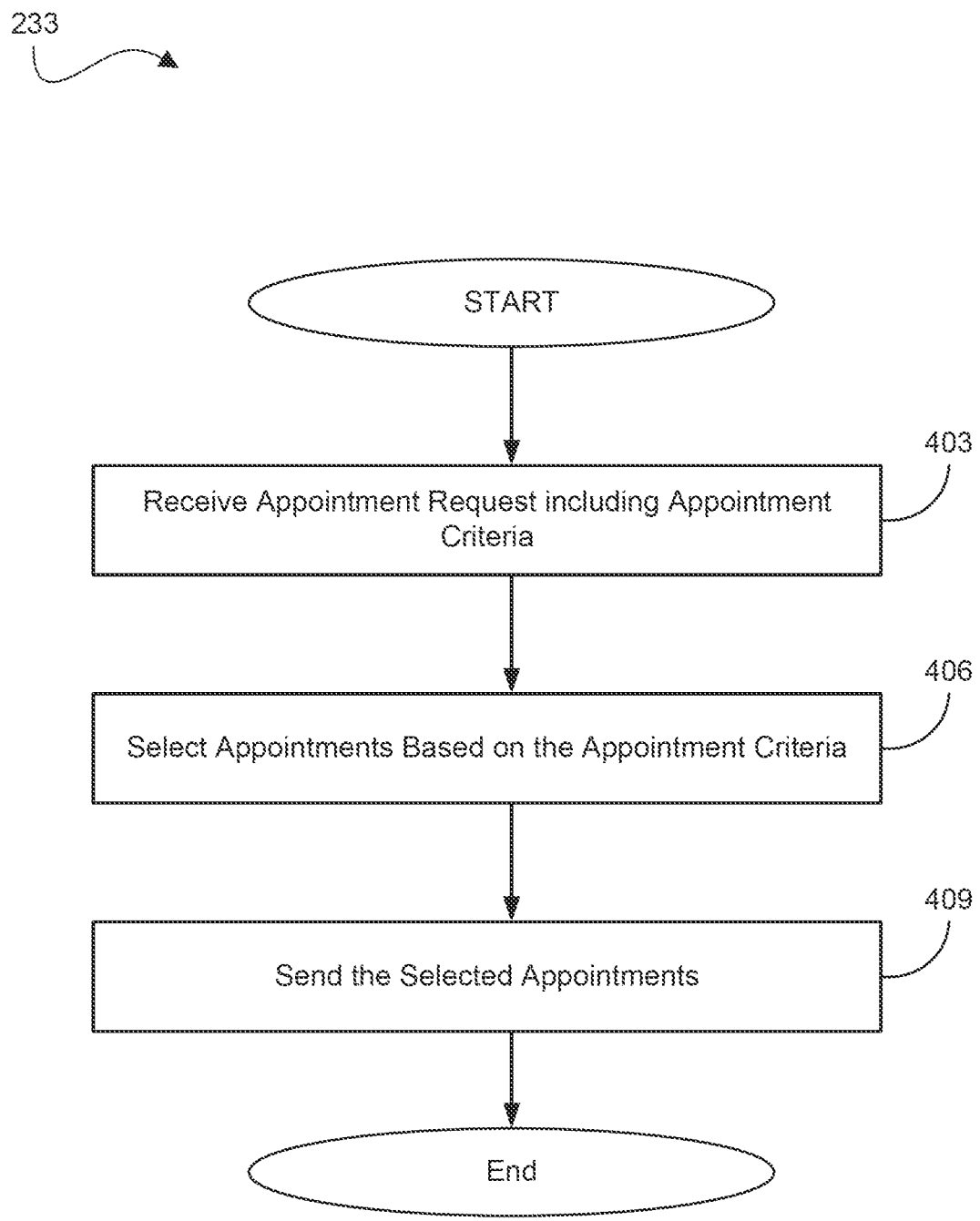
FIG. 4 is a flowchart illustrating one example of functionality implemented as portions of an application executed in the network environment of FIG. 2 according to various embodiments of the present disclosure.

Referring next to FIG. 4, shown is a flowchart that provides one example of the operation of a portion of the calendar service 233. The flowchart of FIG. 4 provides merely an example of the many different types of functional arrangements that can be employed to implement the operation of the depicted portion of the calendar service 233. As an alternative, the flowchart of FIG. 4 can be viewed as depicting an example of elements of a method implemented within the network environment 200.

Beginning with block 403, the calendar service 233 can receive an appointment request including appointment criteria. For instance, the appointment request can include a date and/or time of the computing environment 203, a date and/or time related to the client device 206, a location 221 corresponding to a client device 206, information to identify a specific user of the client device 206 on the calendar service 233, and/or various other appointment criteria.

Next, at block 406, the calendar service 233 can select appointments based on the appointment criteria received in the appointment request of block 403. The calendar service 233 can use user identification information from the appointment request to narrow down the list of appointments 239 to just appointments 239 for the user. In at least one embodiment, the calendar service 233B can compare a date and/or time received in the appointment request to the appointment times 242B for the appointments 239 in a calendar data store 236. In some embodiments, an appointment 239 can be selected based on the location information received at block 403. One or more appointments 239 can be selected and placed into a list of appointments 239.

Next, at block 409, the calendar service 233 can send the list of selected appointments 239 to the UEM application 227. Once the calendar service 233 has sent the list of selected appointments 239 to the UEM application 227, the flowchart of FIG. 4 can come to an end.

Figure 5:
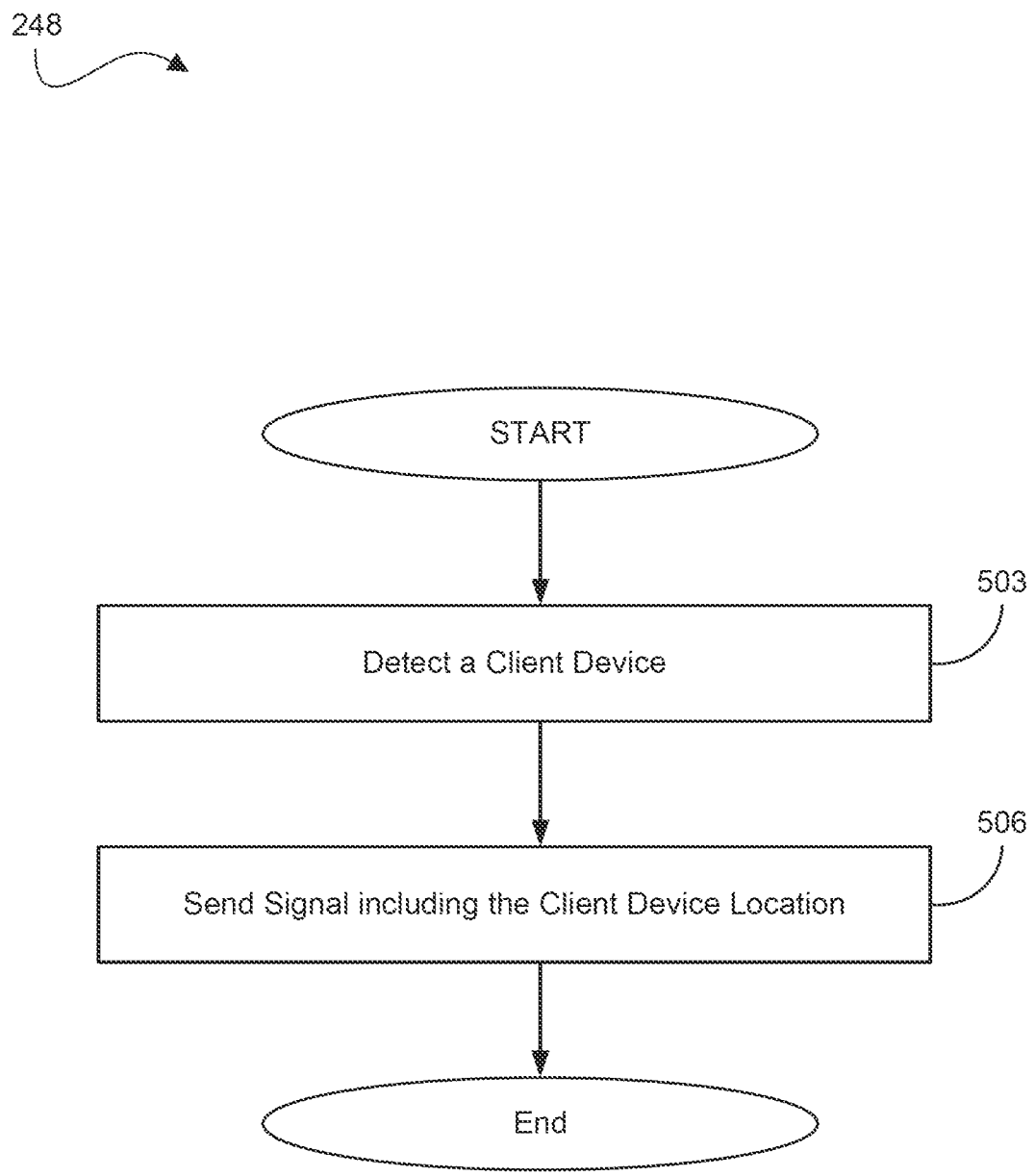
FIG. 5 is a flowchart illustrating one example of functionality implemented as portions of an application executed in a location detection device in the network environment of FIG. 2 according to various embodiments of the present disclosure.

Referring next to FIG. 5, shown is a flowchart that provides one example of the operation of a portion of the location detection application 248. The flowchart of FIG. 5 provides merely an example of the many different types of functional arrangements that can be employed to implement the operation of the depicted portion of the location detection application 248. As an alternative, the flowchart of FIG. 5 can be viewed as depicting an example of elements of a method implemented within the network environment 200.

Beginning with block 503, the location detection application 248 can detect a client device 206. In at least one embodiment, the location detection application 248 can detect a proximity of network 209 connected devices, such as a client device 206, by intercepting network packets sent from the client application 230. In at least another embodiment, the location detection application 248 can make a connection with the client device 206 that is not over the network 209, such as a direct wired or wireless connection. For example, the client device 206 can attempt to connect to the location detection device 106 over Bluetooth. In another example, the client device 206 can interact with the location detection device 106, such as scanning or being scanned over a short-range wireless frequency, such as RFID, or other short range wireless frequencies.

Next, at block 506, the location detection application 248 can send a signal to the UEM application 227 including information about the client device location. In at least one embodiment, the location detection application 248 can send a signal to the UEM application 227 including detailed information regarding an estimated distance for which the location detection device 106 is related to the client device 206. The location detection application 248 may be capable of calculating a distance by measuring the ping rate between the location detection device 106 and the client device 206 over a wireless connection. In at least another embodiment, the location detection application 248 can send a signal to the UEM application 227 including detailed information regarding the location of the location detection device 106 rather than the client device 206. The location detection application 248 can send the location of the location detection device 106 in lieu of the location of the client device 206. In such a situation, the location detection device 106 would be in close proximity to the client device 206 for the location detection application 248 to have detected the client device 206, so the location of the location detection device 106 would be very similar to the actual location of the client device 206. Once the location detection application 248 sends a signal to the UEM application 227, the process of FIG. 5 can end.

Figure 6A:
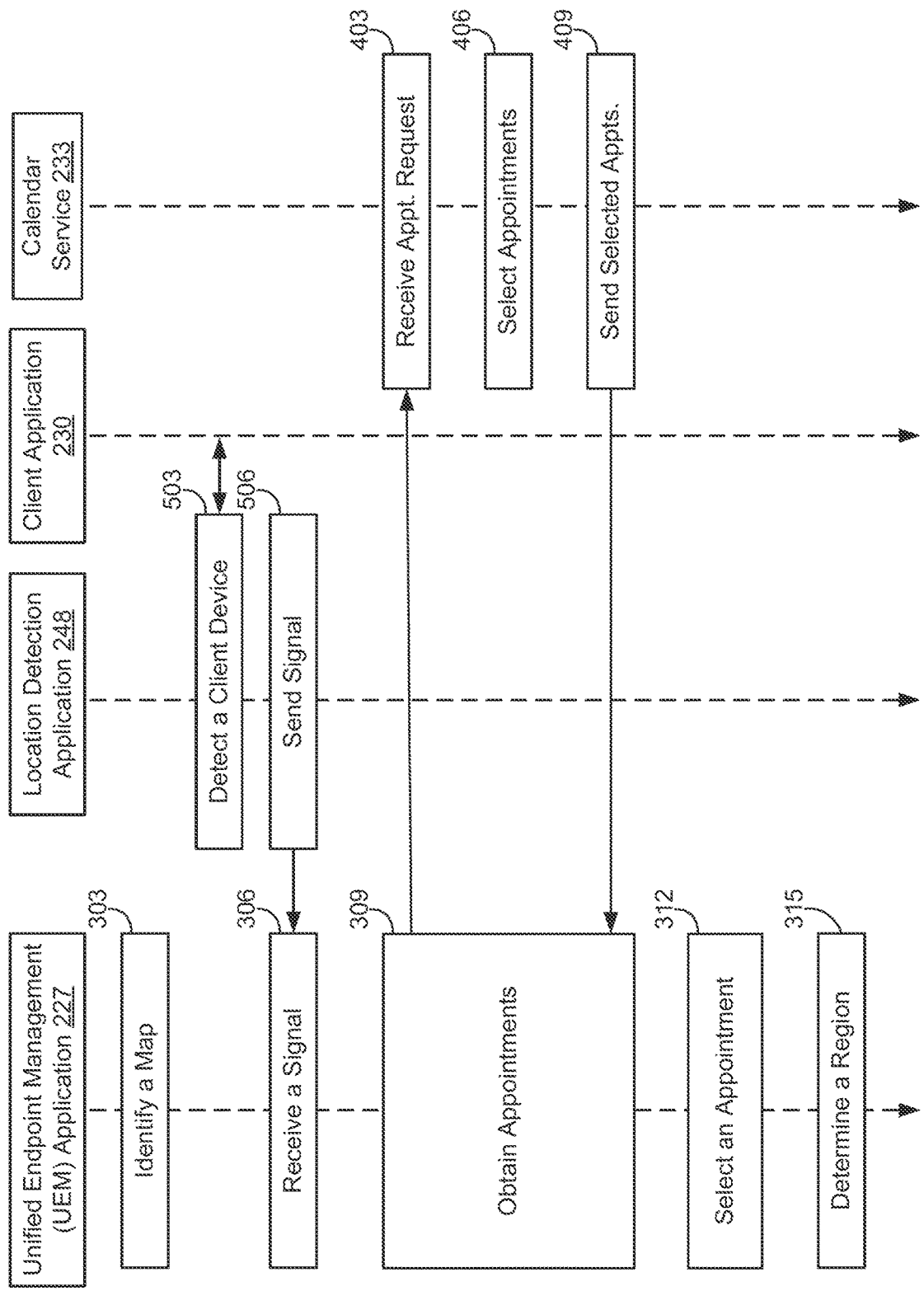
FIGS. 6A and 6B are sequence diagrams illustrating one example of functionality implemented as portions of various applications executed in the network environment of FIG. 2 according to various embodiments of the present disclosure.
Figure 6B:
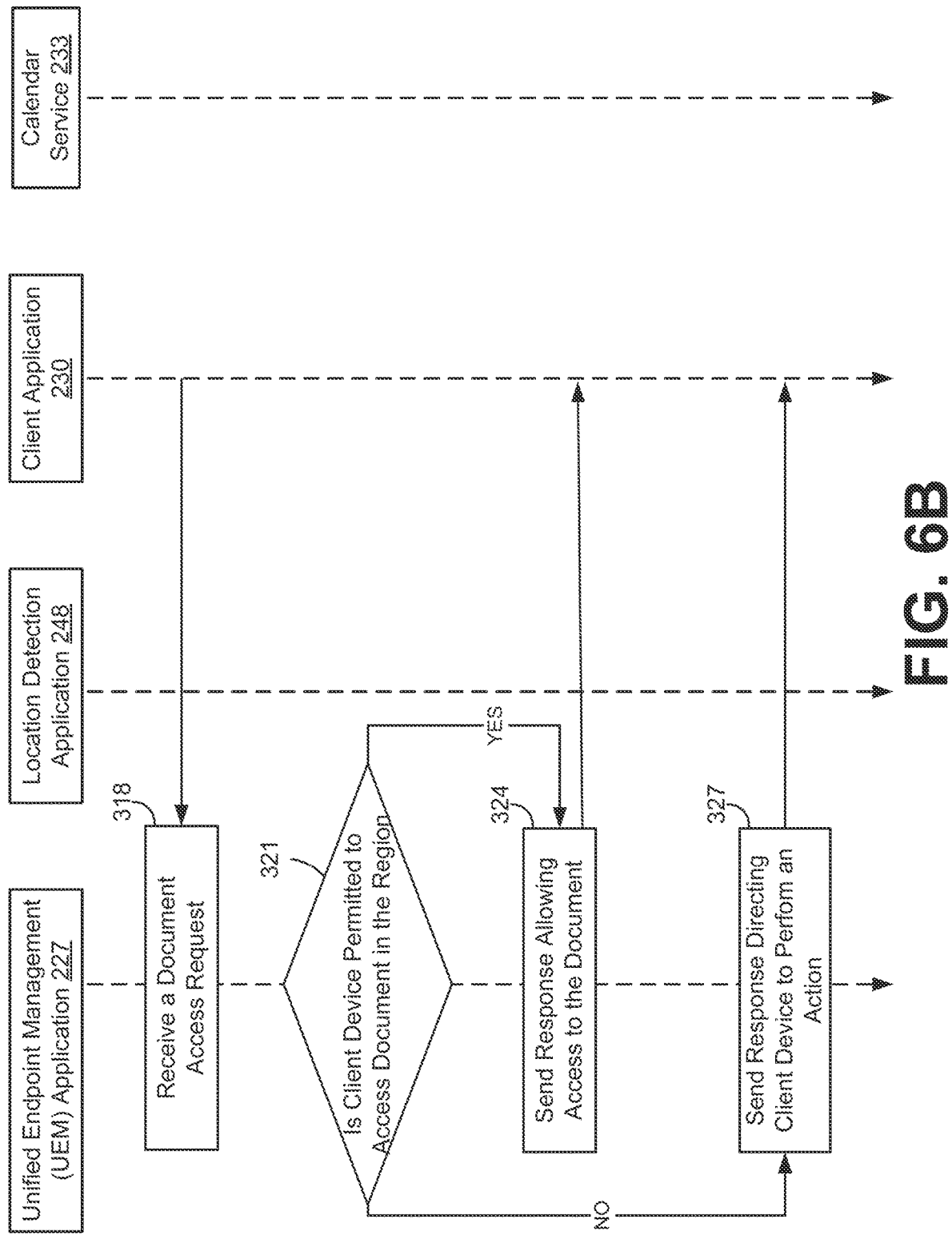

Referring next to FIGS. 6A and 6B, shown are sequence diagrams that provide at least one example of the ordered sequence between a UEM Application 227, a location detection application 248, a client application 230, and a calendar service 233. The sequence diagrams of FIGS. 6A and 6B provide merely as an example of the many different types of functional arrangements that can be employed to implement the operations between a UEM Application 227, a location detection application 248, a client application 230, and a calendar service 233. As an alternative, the sequence diagrams of FIGS. 6A and 6B can be viewed as depicting an example of various elements of a method implemented among one or more devices in the network environment 200.

The sequence diagram can begin on FIG. 6A with block 303, where the UEM Application 227 identifies a map 100, as previously described in the discussion of block 303 of FIG. 3. Next, the location detection application 248 can detect a client device 206, as previously described in the discussion of block 503 of FIG. 5. Next, the location detection application 248 can send a signal to the UEM Application 227, as previously described in the discussion of block 506 of FIG. 5. Next, the UEM Application 227 can receive the signal from the location detection application 248, as previously described in the discussion of block 306 of FIG. 3.

Next, the UEM Application 227 can obtain appointments 239 from the calendar service 233, as previously described in the discussion of block 309 of FIG. 3. In obtaining the appointments 239, the UEM application 227 can send an appointment request to the calendar service 233 and the calendar service 233 can receive the appointment request, as previously described in the discussion of block 403 of FIG. 4. The calendar service 233 can then select appointments 239, as previously described in the discussion of block 406 of FIG. 4. The calendar service 233 can then send the appointments 239 to the UEM application 227, as previously described in the discussion of block 409 of FIG. 4. This results in the UEM Application 227 having successfully obtained the appointments 239 from the calendar service 233, as previously described in the discussion of block 309 of FIG. 3.

Next, the UEM Application 227 can select an appointment 239 from the list of appointments 239, as previously described in the discussion of block 312 of FIG. 3. Next, the UEM Application 227 can determine a region 103, as previously described in the discussion of block 315 of FIG. 3. Next, the UEM Application 227 can receive a document access request from the client application 230, as previously described in the discussion of block 318 of FIG. 3.

The sequence diagram then continues to FIG. 6B, at block 321, where the UEM application 227 determines whether the client device 206 is permitted to access a document 215 in the region 103, as previously described in the discussion of block 321 of FIG. 3. If the UEM application 227 determines that the client device 206 is permitted to access the document 215 in the region 103, then the UEM application 227 can send a response allowing access to the document 215, as previously described in the discussion of block 324 of FIG. 3. If the UEM application 227 determines that the client device 206 is permitted to access the document 215 in the region 103, then the UEM application 227 can send a response to the client application 230 allowing access to the document 215, as previously described in the discussion of block 324 of FIG. 3. If the UEM application 227 determines that the client device 206 is not permitted to access the document 215 in the region 103, then the UEM application 227 can send a response to the client application 230 directing the client device 206 to perform an action, as previously described in the discussion of block 327 of FIG. 3. At this point, the sequence diagrams of FIGS. 6A and 6B come to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system, comprising:
   a computing device comprising a processor and a memory; and
   machine-readable instructions stored in the memory that, when executed by the processor, cause the computing device to at least:
   identify a map having a plurality of regions, each region of the plurality of regions corresponding to a real-world location and one of a plurality of security indicators;
   receive, from a location detection device, a first signal that indicates that a client device of a user has entered a first real-world location containing the location detection device, wherein the location detection device electronically communicates with the client device to detect that the client device is in proximity of the first real-world location, wherein the location detection device is one of a network access point or a wireless radio frequency reader;
   determine, based on the first signal and based on an appointment location of the user, a first region of the plurality of regions, wherein the first region corresponds to the first real-world location and a first security indicator of the plurality of security indicators, and wherein determining the first region further includes:
   requesting, from a calendar service, a list of appointments for the user; and
   selecting, in response to receiving the first signal, an appointment from the list of appointments based on time, the appointment comprising an appointment time and the appointment location;
receive a document access request to access a document, the document being associated with a second security indicator;
determine, based on a comparison of the first security indicator of the first region to the second security indicator of the document, that the client device is not permitted to access the document while located in the first region;
send, to the client device, a first response that directs the client device to block the user of the client device from using the client device to access the document while the client device remains located in the first real-world location;
receive a second signal that indicates that the client device has entered a second real-world location;
determine, based on the second signal, a second region of the plurality of regions, wherein the second region corresponds to the second real-world location and a third security indicator of the plurality of security indicators;
determine, based on a comparison of the third security indicator of the second region to the second security indicator of the document, that the client device is permitted to access the document while located in the second region; and
send, to the client device, a second response that directs the client device to grant the user access to the document using the client device.

2. The system of claim 1, wherein the calendar service is hosted on the client device.

3. The system of claim 1, wherein the first region corresponds to one or more rooms on a floor plan.

4. The system of claim 1, wherein sending the first response further comprises sending, to the client device, an instruction to display a warning on the client device.

5. The system of claim 1, wherein receiving a second signal that indicates that the client device has entered a second real-world location further comprises receiving the second signal from a second location detection device that electronically communicates with the client device to detect that the client device is in proximity of the second real-world location.

6. A method, comprising:
identifying a map having a plurality of regions, each region of the plurality of regions corresponding to a real-world location and one of a plurality of security indicators;
receiving, from a location detection device, a first signal that indicates that a client device of a user has entered a first real-world location containing the location detection device, wherein the location detection device electronically communicates with the client device to detect that the client device is in proximity of the first real-world location, wherein the location detection device is one of a network access point or a wireless radio frequency reader;

determining, based on the first signal and based on an appointment location of the user, a first region of the plurality of regions, wherein the first region corresponds to the first real-world location and a first security indicator of the plurality of security indicators, and wherein determining the first region further includes:
   requesting, from a calendar service, a list of appointments for the user; and
   selecting, in response to receiving the first signal, an appointment from the list of appointments based on time, the appointment comprising an appointment time and the appointment location;
receiving a document access request to access a document, the document being associated with a second security indicator;
determining, based on a comparison of the first security indicator of the first region to the second security indicator of the document, that the client device is not permitted to access the document while located in the first region;
sending, to the client device, a first response that directs the client device to block the user of the client device from using the client device to access the document while the client device is located in the first real-world location;
receiving a second signal that indicates that the client device has entered a second real-world location;
determining, based on the second signal, a second region of the plurality of regions, wherein the second region corresponds to the second real-world location and a third security indicator of the plurality of security indicators;
determining, based on a comparison of the third security indicator of the second region to the second security indicator of the document, that the client device is permitted to access the document while located in the second region; and
sending, to the client device, a second response that directs the client device to grant the user access to the document using the client device.

7. The method of claim 6, wherein the calendar service is hosted on the client device.

8. The method of claim 6, wherein the first region corresponds to one or more rooms on a floor plan.

9. The method of claim 6, wherein sending the first response to the client device further comprises sending, to the client device, an instruction to display a warning on the client device.

10. A non-transitory, computer-readable medium, comprising machine-readable instructions that, when executed by a processor of a computing device, cause the computing device to at least:
identify a map having a plurality of regions, each region of the plurality of regions corresponding to a real-world location and one of a plurality of security indicators;
receive, from a location detection device, a first signal that indicates that a client device of a user has entered a first real-world location containing the location detection device, wherein the location detection device electronically communicates with the client device to detect that the client device is in proximity of the first real-world location, wherein the location detection device is one of a network access point or a wireless radio frequency reader;
determine, based on the first signal and based on an appointment location of the user, a region of the plurality of regions, wherein the region corresponds to the first real-world location and a first security indicator of the plurality of security indicators, and wherein determining the region further includes:
  requesting, from a calendar service, a list of appointments for the user; and
  selecting, in response to receiving the first signal, an appointment from the list of appointments based on time, the appointment comprising an appointment time and the appointment location;
receive a document access request to access a document, the document being associated with a second security indicator;
determine, based on a comparison of the first security indicator of the region to the second security indicator of the document, that the client device is not permitted to access the document while located in the region;
send, to the client device, a response that directs the client device to block the user of the client device from using the client device to access the document while the client device remains in the first real-world location;
receive a second signal that indicates that the client device has entered a second real-world location;
determine, based on the second signal, a second region of the plurality of regions, wherein the second region corresponds to the second real-world location and a third security indicator of the plurality of security indicators;
determine, based on a comparison of the third security indicator of the second region to the second security indicator of the document, that the client device is permitted to access the document while located in the second region; and
send, to the client device, a second response that directs the client device to grant the user access to the document using the client device.

11. The non-transitory, computer-readable medium of claim 10, wherein the calendar service is hosted on the client device.

12. The non-transitory, computer-readable medium of claim 10, wherein sending the first response to the client device includes sending, to the client device, an instruction to display a warning on the client device.

* * * * *